Figure 1:
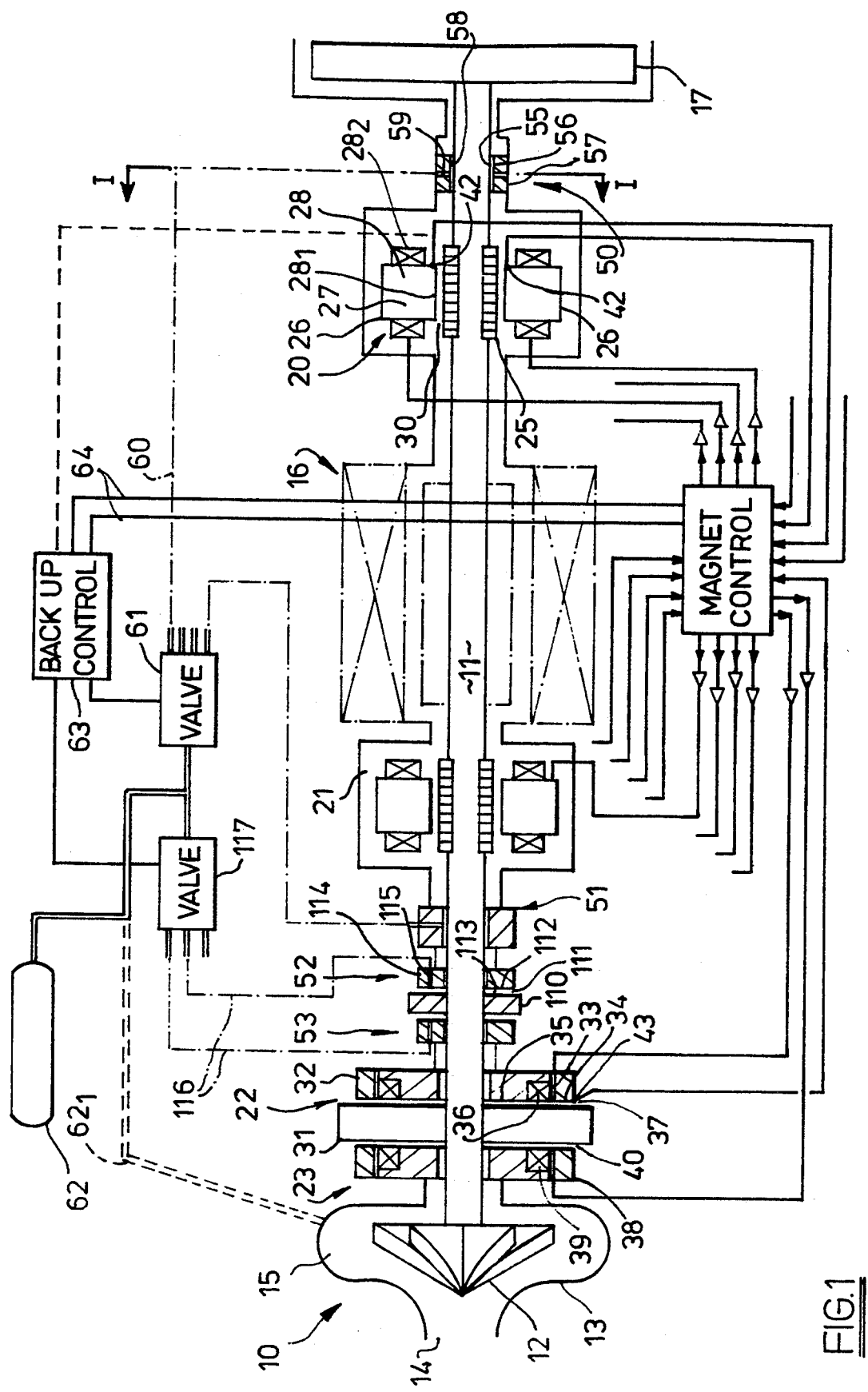

United States Patent [19]

New

[11] Patent Number: 5,345,127
[45] Date of Patent: Sep. 6, 1994

[54] MAGNETIC BEARING BACK-UP

[75] Inventor: Nigel H. New, Harrow, United Kingdom

[73] Assignee: The Glacier Metal Company Limited, Middlesex, England

[21] Appl. No.: 91,184

[22] Filed: Jul. 14, 1993

[30] Foreign Application Priority Data

Jul. 23, 1992 [GB] United Kingdom ................. 9215620

[51] Int. Cl.$^5$ ......................... H02K 7/09; F16C 21/00
[52] U.S. Cl. .................................... 310/90.5; 384/102
[58] Field of Search ................. 310/90, 90.5; 384/100, 384/102, 114

[56] References Cited

U.S. PATENT DOCUMENTS

| 4,982,126 | 1/1991 | Jolivet et al. | 310/90.5 |
| 5,126,641 | 6/1992 | Putman et al. | 318/128 |

FOREIGN PATENT DOCUMENTS

| 0392677A1 | 10/1990 | European Pat. Off. . |
| 9112813 | 1/1992 | Fed. Rep. of Germany . |
| 0287440A1 | 10/1988 | France . |
| 0341137A1 | 11/1989 | France . |
| 2234560A | 2/1991 | United Kingdom . |

Primary Examiner—Steven L. Stephan
Assistant Examiner—Clayton E. LaBalle
Attorney, Agent, or Firm—Nixon & Vanderhye

[57] ABSTRACT

A magnetic bearing arrangement for a rotatable shaft 11 including electromagnetic journal bearings 20, 21 and electromagnetic thrust bearings 22, 23, is provided with back-up bearings provided as hydrostatic journal bearings 50, 51 and thrust bearings 52, 53. The hydrostatic bearings are energized by controls 63 responsive to detected failure of the magnetic bearing to support the shaft in any particular direction within a permitted range of displacements and supplied with fluid at such pressure to support the shaft on a fluid film at all speeds down to rest. Preferably the fluid is a gas.

15 Claims, 2 Drawing Sheets

MAGNETIC BEARING BACK-UP

This invention relates to magnetic bearing arrangements for supporting a rotatable shaft against radially acting forces as journal bearings and against axially acting forces as thrust bearings, and in particular relates to so-called back-up bearings for such arrangements which are intended to operate in the event of the magnetic bearings failing to provide proper support for the shaft against such forces.

Magnetic bearings may be passive, comprising only permanent magnets, or active, comprising electromagnetic bearings, with or without permanent magnets.

In this specification the term "magnetic bearing" when used in an unqualified sense is intended to encompass both kinds and within context of relating to one kind or the other, as a convenient reference to that type of bearing arrangement, that is, with the qualification active or passive implied.

Active magnetic bearings for supporting shafts (or other moving bodies) exist in different forms for acting in journal and thrust roles. Usually an armature of suitable ferromagnetic material is formed on, in, or by the shaft to comprising a movable armature and electromagnets are disposed adjacent the movable armature arranged uniformly about the shaft to form stationary armature means. Each electromagnet comprises a ferromagnetic core having one or more limbs, about which one or more electromagnet coils are wound, ending in pole faces which face the movable armature, the core and armature defining a magnetic circuit which includes a small air gap between them. In operation the shaft is suspended with its armature between the pole faces, and a suspension gap between the shaft armature and the individual pole faces is maintained in excess of a predetermined minimum width, at which physical contact may occur, by controlling the currents in the various electromagnet coils in response to sensing the actual gap width.

In practice, because of the possibility of electrical failure or of an exceptional force acting on the shaft that the electromagnetic force is unable to counter, such magnetic bearings are often provided with back-up bearing means which comprises one part carried by the shaft and another part stationary and separated from said one part, when the magnetic bearing is in operation, by a gap which is less than the physical separation between pole faces and armature of the magnetic bearing and which then defines said predetermined minimum gap width, the intention being that if the shaft is displaced from its normally central position within the gap by sufficient extent the back-up bearing parts will contact as running surfaces to support the shaft temporarily.

Passive magnetic bearings tend to operate by repulsion between permanent magnets, being used mainly, but not exclusively, in a thrust bearing role. Although passive magnetic bearings are not susceptible to internal power failure in respect of their ability to provide suspension forces, they are susceptible to external forces acting thereon and may also require back-up bearing means to prevent collision between rotor and stator parts.

The provision of such back-up bearing means is itself not without problems. Machine shafts for which magnetic bearings are suitable tend to rotate at very high speeds for which other bearing types are unsuitable, and contacting running surfaces of a back-up bearing may have difficulty in operating or commencing operation if such contact is made at high speed and/or may be required to dissipate large quantities of heat generated by friction. Proposals have been made for back-up bearings which have higher friction, but better able to operate at higher speeds, combined with lower friction parts able to operate at lower speeds, but notwithstanding any relative efficiencies of such complementary back-up bearing structures, they produce heat for the dissipation of which elaborate precautions are necessary.

It is an object of the present invention to provide a magnetic bearing arrangement which includes back-up bearing means that mitigates at least some of the above outlined disadvantages of known back-up bearings. It is also an object of the present invention to provide a turbomachine including such an arrangement.

According to one aspect of the present invention a magnetic bearing arrangement for a rotatable shaft includes a magnetic bearing and back-up bearing means the back-up bearing means comprising a hydrostatic bearing (as herein defined) including adjacently disposed rotatable and stationary running surfaces spaced from each other to define a support gap when the shaft is within a predetermined range of operational shaft positions within said magnetic bearing, a source of pressurised fluid and back-up control means responsive to a detected inability of the magnetic bearing to support said shaft within said predetermined range of operational shaft positions to provide fluid to the support gap to form therein a film at such hydrostatic pressure as to support said shaft within said predetermined range of operational shaft positions.

According to another aspect of the invention a turbomachine operable to process a fluid at elevated pressure includes a magnetic bearing arrangement as defined in the preceding paragraph. In such a turbomachine the back-up bearing means fluid may be derived at least in part from the process fluid.

In this specification the terms hydrostatic bearing and hydrostatic pressure are employed notwithstanding the nature of the fluid, that is, whether it is a liquid or gas, and should be read accordingly.

The back-up bearing means associated with such magnetic bearing or bearing type, that is, a radial journal bearing or axial thrust bearing, may be formed adjacent the magnetic bearing backed up thereby or may be formed separately therefrom at such a location or locations with respect to the shaft as to provide the necessary support.

In particular, the stationary running surface of the backup bearing means may comprise a surface of a solid body through which extends at least one fluid channel opening to the said running surface and the solid body may carry the stationary running surfaces of both a radial journal bearing and a stationary running surface of an axial thrust bearing, there being provided between said stationary running surface means to prevent fluid leakage from one bearing interfering with operation of the other.

Preferably the hydrostatic bearing means is arranged to support the shaft for all rotational speeds, that is, speeds from normal running speeds down to zero, should magnetic bearing failure require the shaft to be brought to rest. In such a case the hydrostatic bearing means may have said rotatable and stationary running surfaces adapted for running in contact with each other at low shaft rotational speeds and the back-up control means arranged at such low speeds not to provide fluid to the hydrostatic bearing at such pressure to effect support of the shaft, although it may be arranged to provide fluid at low pressure to the contacting running surfaces to extract heat therefrom.

Figure 2:
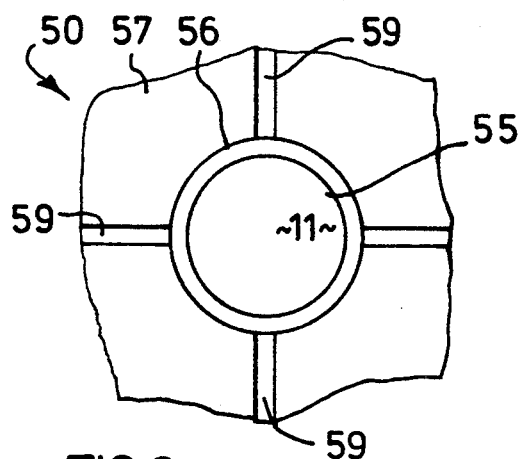
Figure 3:
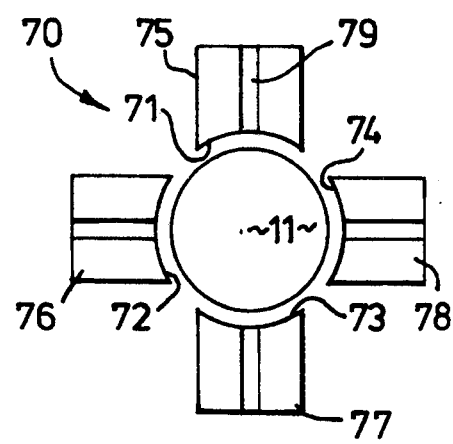
Figure 5:
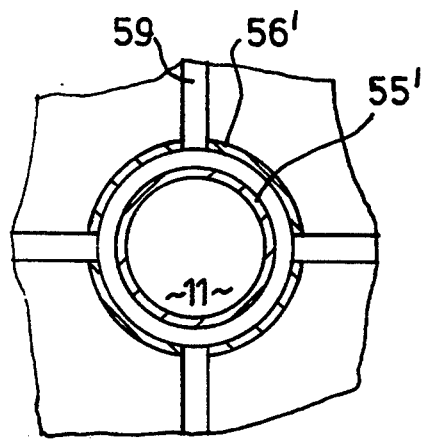
Figure 4:
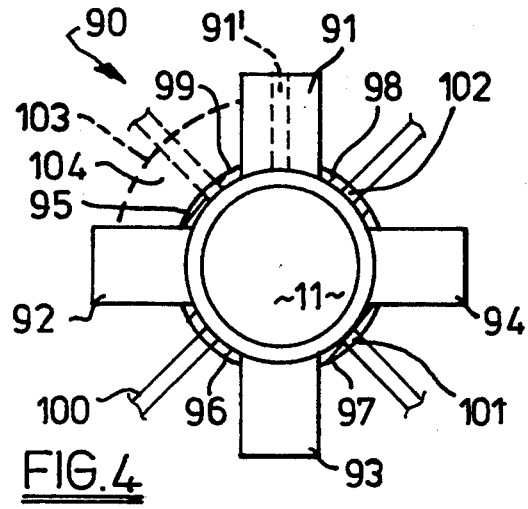
Figure 6:
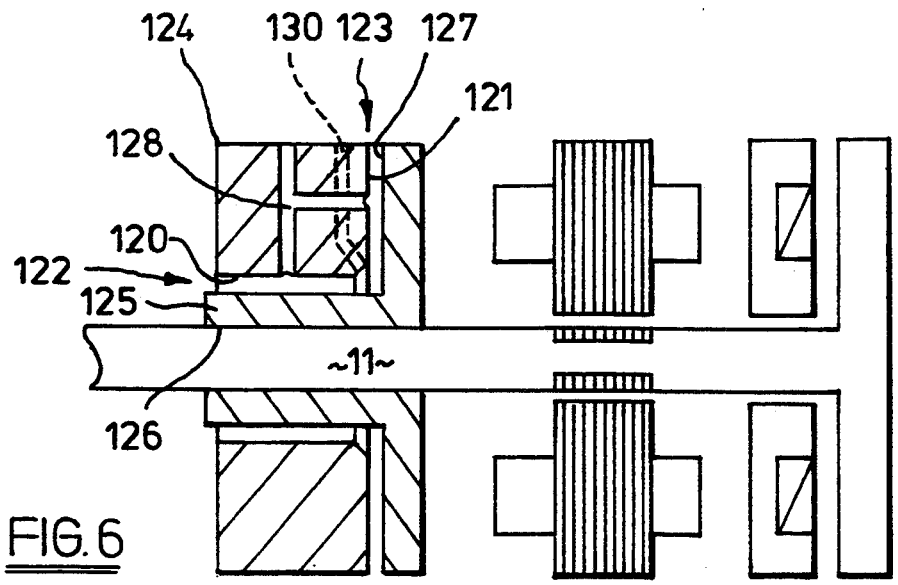

Embodiments of the invention will now be described by way of example with reference to the accompanying drawings, in which:

FIG. 1 is a schematic representation of a turbomachine including an active magnetic bearing arrangement in accordance with the present invention illustrating both magnetic radial, or journal, bearings and magnetic axial, or thrust, bearings and, alongside each, back-up bearing means therefor, FIG. 2 is a fragmentary cross-sectional view along the line I—I of FIG. 1 showing the first form of implementation of the hydrostatic back-up journal bearing means associated with the journal bearing, and FIG. 3 is a cross-sectional view similar to FIG. 2 but showing a second form of implementation of the hydrostatic back-up journal bearing means associated with the journal, FIG. 4 is a cross-sectional view similar to FIG. 3 but showing a third form of implementation of the hydrostatic back-up journal bearing means associated with the journal bearing, FIG. 5 is a cross-sectional view similar to FIG. 2 but showing a fourth form of implementation of the hydrostatic back-up journal bearing means associated with the journal bearing, and FIG. 6 is a sectional view elevation of part of a machine similar to that of FIG. 1 but showing a second form of implementation of the back-up bearing means associated with both the journal bearing and an axial thrust bearing, Referring to FIG. 1, a turbomachine 10 includes a shaft 11 at one end of which is carried an impeller 12 disposed in a housing 13 having an inlet duct 14 for fluid to be processed thereby and an outlet duct 15 from which process fluid is supplied at high pressure. The shaft is suspended with respect to active magnetic bearings and may be rotated by an electric motor, indicated ghosted at 16 and having a rotor coaxial with shaft 11, or by a fluid impeller 17 in receipt of fluid at elevated pressure. The driving fluid and/or the driven (compressed) fluid may be a liquid or a gas, but in practice it is more usual to find magnetic bearings in use where rotational speed of the shaft is high and the process fluid is a gas.

The nature of the machine is not directly important to an explanation of the invention and is shown and described only to such extent as is necessary in relation to the magnetic bearings 20, 21 which support the shaft as journal bearings and magnetic thrust bearings 22 and 23.

The journal bearing 20 comprises a movable armature 25 defined on, at, or in the surface of the shaft 11 and formed in conventional manner of laminations of ferromagnetic material which may form part of a magnetic circuit minimising the formation of eddy currents as the shaft rotates. Disposed adjacent the shaft is stationary armature means 26 which comprises a plurality of electromagnets arranged about the shaft, typically four at 90° intervals. Each electromagnet comprises a ferromagnetic core 27, again made up of laminations, having a plurality of limbs, such as 28, extending radially inwardly and each ending in a pole face $28_1$, respectively, facing, and spaced slightly from, the movable armature 25 when it is disposed suspended centrally within the bearing by a suspension gap 30. The core, and typically each limb, supports an electromagnet coil $28_2$. Other electromagnets in different planes (not shown) are similar. The other journal bearing 21 is identical. Each journal bearing, and preferably each electromagnet thereof, has associated with it a displacement sensing means for providing signals representative of the separation between the movable armature and each pole face.

The magnetic thrust bearing 22 serves to "suspend" the shaft in an axial direction against an axial thrust exerted on the shaft aerodynamically, such as by the process or driving gas. It includes a movable armature in the form of radially extensive rotor 31 carried by the shaft 11 and, facing one side of the rotor, stationary armature means comprising electromagnet 32 in the form of an annular ferromagnetic core encircling the shaft and including an annular groove 33 facing the rotor defining on the core annular pole faces 34, 35 and containing an electromagnet coil 36, the rotor being normally suspended in an axial direction by a balancing of axial forces on the shaft with a gap 37 between the rotor and each pole face.

A second magnetic thrust bearing 23 is formed by the rotor 31 and stationary armature means comprising electromagnet 38, containing electromagnet coil 39, disposed facing the opposite face of the rotor from the electromagnet 32 and spaced from the rotor by suspension gap 40. However, if the shaft is subjected to a continuous external axial force, such as an aerodynamic thrust acting on an impeller, then an electromagnet may be required only to one side of the rotor 31 to counter this, whereas in the absence of such continuous force, electromagnets may be disposed on both sides to effect opposing forces.

In operation, the electromagnets of each journal or thrust bearing are energised differentially in order to maintain, ideally, a uniform suspension gap between each pole face and the armature in response to the sensed displacements between the moveable armature and each pole face by means of magnet control means 41 provided with radial shaft displacement signals by sensing means 42 and axial shaft displacement signals by sensing means 43. The speed and severity of increased magnetic force between the moveable armatures 25 or 31 and any pole face in response to sensing an increase in gap width between them and/or decrease in gap width in the opposite direction must clearly effect a counter force on the shaft before the armature and pole can collide, and to this end, such bearings are usually highly responsive to small shaft displacements, that is, have great stiffness.

In accordance with the present invention back-up bearing means is provided taking the form of one or more hydrostatic bearings. In a first embodiment shown in FIG. 1, separate hydrostatic back-up journal bearings 50 and 51 are associated individually with magnetic journal bearings 20 and 21 and likewise separated axially along the shaft 11; hydrostatic back-up thrust bearings 52 and 53 are associated individually with magnetic thrust bearings 22 and 23, also displaced therefrom along the shaft. Considering the back-up journal bearing 50 associated with magnetic journal bearing 20, this is conveniently disposed in the vicinity of the magnetic bearing and includes adjacently disposed rotatable and stationary running surfaces 55 and 56 formed respectively by or on the surface of the shaft and the surface of solid body 57 which encircles the shaft. The running surfaces are arranged to be spaced from each other to define a support gap 58, analogous to suspension gap 30, when the shaft 11 is within a predetermined range of operational shaft positions within the magnetic bearing. That is, displacement of the shaft from its ideal position within the suspension gap 30 of the magnetic bearing is countered by the magnet control means 41 which restores the shaft position from within a predetermined range of shaft positions, beyond which range the control is assumed lost and the back-up bearing is operational to effect shaft support.

The solid body 57 carrying the stationary running surfaces is dimensioned in respect of the running surface such that the support gap defined between the rotatable and running surfaces can, at least when the shaft position is at its limit of its predetermined operational range of positions, function by the supply of fluid thereto under pressure as a hydrostatic bearing. In practice the operational range of shaft positions may be so restricted that the gap in normal operational position of the shaft is capable of functioning as a hydrostatic bearing to support the shaft.

Referring also to FIG. 2, the body 57 has fluid channels 59 extending therethrough, opening at the running surface [57 has fluid channels 59 extending therethrough, opening at the running surface] 56 and connected by way of fluid lines 60 and fluid valve means 61 to receive pressurised fluid from source 62 under the control of back-up control means 63.

The back-up control means is connected to the magnet control means 31 by way of signal lines 64 to receive signals indicative of the inability of the magnetic bearing to support the shaft within said predetermined range of operational shaft positions.

Although such signals for use by the back-up control means may be derived directly from the sensors 42 or from a completely different set (not shown), possibly associated with the support gap 58, to make the back-up bearing means completely independent of the magnetic bearing, and equally responsive to loss of control after it is manifested by shaft position, it will be appreciated that if loss of control is due to electrical failure of the magnetic bearing then such change of shaft position may be anticipated at the magnet control means before its inevitable occurrence. That is, by deriving the back-up control signals from the magnetic control means it may be possible to detect an inability of the magnetic bearing to support the shaft within said predetermined range of operational shaft positions other than by direct measurement resulting from displacement.

In operation of the magnetic bearing arrangement, in response to a detected inability of the magnetic bearing 50, or possibly any bearing at all, to support the shaft in the said predetermined range of operational shaft positions, the back-up control means opens the valve means 61 to supply fluid by way of the ducts 59 to the support gap 58 to form therein a fluid film of such hydrostatic pressure as to then support the shaft running surface 55 clear of the stationary running surface 56, that is, support the shaft within said predetermined range of operational shaft positions.

As indicated above, it is usual for the predetermined range of operational shaft positions to be small and for the gap between the running surfaces of the back-up bearings to be small so that a complete annular fluid film may be formed and the load of the shaft taken by the hydrostatic pressure maintained throughout the film at any time and irrespective of direction of shaft displacements.

Furthermore, the support pressure will be self-regulating in that any localised variations in shaft load on the fluid film due to external forces serves only to restrict any fluid leakage at that point and thus to increase the pressure of the supporting film.

It will be appreciated that even if such hydrostatic fluid film is not continuous about the shaft but exists at load bearing sites distributed about the shaft then if the fluid is supplied concurrently to all running surfaces the same self-regulating effect occurs.

Referring now to FIG. 3, this shows at 70 in a cross-sectional view similar to FIG. 2, a modified form of the hydrostatic back-up journal bearing 50 of that Figure. The bearing 70 comprises the same running surface 55 of shaft 11 and a plurality of stationary running surfaces 71–74 each formed on one of a plurality of blocks 75–78 respectively arrayed about the shaft. Each of the blocks has a channel 79, corresponding to 59 extending therethrough, and opening to its running face, each channel being coupled to the valve means 61 for the supply of fluid thereto in order to develop a hydrostatic back-up bearing of four regions or pads of support gap.

FIG. 4 shows at 90 a cross-sectional view, similar to that of FIGS. 2 and 3, of a third form of hydrostatic back-up journal bearing which is a modification of the bearing 70. In this arrangement the bearing again comprises a plurality of blocks arrayed about the running surface 55 of shaft 11, the blocks 91–94 optionally containing through-channels, such as 91', for the supply of fluid to the support gap, and bridging pieces 95–98, each of which provides a stationary running surface, intermediate said blocks and which optionally extend between the adjacent blocks to effect with the blocks a stationary running surface completely encircling the shaft. Some or all of the bridging pieces 95–98 are provided with a through-channel, such as 99–102 respectively, opening connected also to the valve means 61 and by way of which fluid is delivered to the support gap to form a hydrostatic fluid film capable of supporting the shaft.

In a modification of the above, and shown by broken lines 103, the individual blocks 91-94 may be joined radially outwardly of the bridging pieces 99-102 to define between each pair of blocks a plenum chamber 104 to which fluid may be supplied by individual fluid lines from the valve means 61 and then by way of apertures in, or between, bridging pieces to the support gap giving a more uniform distribution of supply. Channels (not shown) provided through or in the running surfaces of said blocks may likewise communicate with such plenum chambers.

It will be appreciated that in general with any of the above described embodiments, although such separate channels may be provided with fluid in common, the valve means 61 may also be arranged to control the supply of fluid to plural channels arrayed about the shaft individually in accordance with determination, from the sensing means 42 or its equivalent, of the direction of change of shaft positions within the suspension gap such that the hydrostatic pressure maintained in respect of the fluid supplied by way of the channels is increased when it acts to overcome a specific directional loading of the shaft.

Notwithstanding the precise constructional detail of the hydrostatic back-up bearing, its hydrostatic nature means that the shaft is supported by the fluid pressure irrespective of shaft speed, and so is able to function at all speeds down to, and including zero, that is, is able to support the shaft as the machine is run down to rest.

It may be preferred, however, to supplement the hydrostatic function of the back-up bearing with contact-making running surfaces which are caused to be effective at very low speeds approaching rest and at rest by controlled reduction in hydrostatic pressure. To this end, and as shown in the cross-sectional elevation of FIG. 5, which corresponds in most respect of FIG. 2, one or both the running surfaces 55' and 56' are formed of a hardened and/or low friction material such that they can run at said low speeds to rest in contact. Indeed such friction as inevitably occurs with such contact may be employed to effect a braking action. Whereas such contact between running surfaces is effected by controlled reduction in hydrostatic pressure, fluid may still be provided at insufficient pressure to effect bearing action but to effect, by leakage thereof, a fluid flow to extract heat from the running surfaces. In this respect the ability to provide such heat extraction, and possibly a degree of lubrication in dependence on the fluid, gives a wider range of suitable running surface materials.

The stationary running surface 56' may be formed as a coating on the surface of the block (or corresponding bridging pieces in the embodiments of FIGS. 3 to 4) or by forming the block of such material, the choices of material being dependant upon the fluid employed.

To the extent necessary for general implementation of the invention, the nature of the fluid is a matter for choice and may be either a liquid or a gas.

Preferably the fluid is a gas and gases are well studied and known for use in hydrostatic, or more precisely, aerostatic bearings. Preferably the gas is plentiful, such as air, although it may also be required to be inert. It may also be possible to employ the motive power of, or process gas of, a turbomachine, where such gas is suitable, as indicated by the broken lines 62' in place of the source 62 extending from the housing 13 to the back-up valve means 61.

However, it may be expected that gas, whilst providing heat extraction from running surfaces enabled to contact, may also be expected to provide less lubrication than a liquid and for the surfaces to effect dry running.

The above described embodiments have concentrated on presenting the invention with reference to the single hydrostatic back-up bearing 50. It will be understood that the hydrostatic back-up bearing 51 is identical in construction, being connected also to the back-up valve means 61 to receive fluid therefrom in response to detected inability of the magnetic bearing 21 individually, or possibly any magnetic bearing, to support the shaft.

The magnetic thrust bearings 22 and 23 have analogous hydrostatic back-up bearings as indicated at 52 and 53.

In the bearing 52, for example, a rotor 110 affixed to shaft 11 extends radially therefrom and one radial face forms a rotatable running surface 111 axially spaced therefrom is a suitable radially extending annular stationary running surface 112, the separation between them, when the shaft is supported axially at an ideal position, comprises supporting gap 113 defining one limit of the predetermined range of operational axial positions permitted of the shaft before the back-up bearing means functions axially.

The stationary running surface 112 may encircle the shaft completely, analogously to the journal bearing running surface 56 of FIG. 2, or may be intermittent, that is, comprise individual bearing pads, analogously to the journal bearing means surfaces 71–74 of FIG. 3.

In the case of a continuous running surface, this is formed on annular block 114 through which extend a plurality of fluid channels 115 opening into the running face 112, the channels being connected by fluid lines 116 to back-up valve means 117, like valve means 61, supplied with fluid by source 62 (or process gas from 13) and controlled by back-up control means 63.

As described above in respect of the journal bearing 50 and with reference to FIGS. 2 to 5, the fluid channels 115 may pass through bridging pieces, possibly defining plenum chambers, between segmented bearing blocks as well as, or instead of, through the blocks, and furthermore the running surfaces 111 and 112 may be adapted for running in contact at low speed either with or without cooling effect of fluid flow and/or any lubricating properties it has. In particular, the body or bodies supporting at least the stationary running surfaces may be formed of a suitable dry running plastics bearing material.

The hydrostatic back-up thrust bearing 53 is formed likewise, the rotatable running surface conveniently being formed on the other radial face of rotor 110, and coupled by fluid lines 116 to the back-up valve means 117.

As stated above with respect to the back-up hydrostatic journal bearing 50, the operation of the back-up bearings 52 and 53 as hydrostatic thrust bearings is controlled by back-up control means 63 in response to the magnet control means 41 sensing inter alia the instantaneous widths of suspension gaps 37 and 40 by sensing means 43. Clearly independent sensing means (not shown) may be associated with the support gaps 113 of the back-up thrust bearings and feed the back-up control means 63 directly, and furthermore separate back-up control means (not shown) corresponding to 63 may be dedicated to the thrust back-up bearings 52, 53 separately from journal back-up bearings 50, 51.

It will be understood that whereas in respect of a hydrostatic back-up bearing it may not matter in which direction shaft displacement occurs to take it to the limit of its predetermined operational range, in the case of a thrust bearing it may be more significant.

In an arrangement, such as shown in FIG. 1, wherein the shaft is suspended axially by the opposing attractions of the electromagnets of the thrust bearing 22 and 23, then failure of any electromagnets per se or displacement of the shaft beyond the control range may cause both electromagnets to be de-energised and for the back-up control means 63 (or equivalent) to energise both hydrostatic back-up bearings 52 and 53. However, if it is desired to respond to an external force displacing the shaft axially or to failure of one electromagnetic bearing then the back-up control means may respond by the narrowing of one support gap by forming a hydrostatic bearing acting only in such direction as to oppose the displacement.

As indicated hereinbefore, the machine arrangement similar to FIG. 1 may have only one magnetic thrust bearing which applies an axially directed magnetic attraction force to the shaft in opposition to an externally applied thrust. Clearly the possibility arises not only of an increase in axial thrust in one direction displacing the rotor towards the thrust bearing electromagnet but also of a decrease in force or electromagnet failure resulting in the shaft being displaced oppositely. Accordingly, hydrostatic back-up bearing means in respect of single electromagnetic thrust bearing preferably still comprises a pair of such bearings as illustrated by 51 and 52, even though the back-up control may energise one only of them at a time in dependence of the shaft displacement and/or its cause. In the event of electromagnet failure and running down of the shaft speed to zero, which may affect any aerodynamically induced axial thrust on the shaft the back-up control means may energise both back-up thrust bearings for stability.

It will be appreciated that other variations of design may be incorporated instead of, or in addition to, those outlined above and within the ambit of the present invention.

For example, and as illustrated in FIG. 6, the stationary running surfaces 120 and 121 of both journal and thrust hydrostatic back-up bearings 122 and 123 respectively may be both carried by a single body 124 which may itself be composed of a suitable dry running self lubricating bearing material, such as that produced by Glacier GmbH-Deva Werke and sold under the Registered Trade Mark DEVA, designed to run at least at low shaft speeds in contact with an L-section sleeve 125 of hardened material carried by shaft 11 and providing both journal and thrust rotor running surfaces 126 and 127 respectively.

The block 24 encircles the shaft and has therethrough fluid channels 128 (129) for supplying fluid to (as appropriate) to the stationary running faces 120, 121 under the control of back-up control means (not shown). To prevent leakage of fluid from the support gaps of either individual bearings interfering with the hydrostatic film of the other bearing means, in the form of a drain channel 130, is provided through the block and opening to the interface between the two stationary running surfaces. Preferably the fluid is a gas and preferably, if pressure is reduced to permit contact of running surfaces, a flow is maintained to extract heat therefrom and protect the surface of the block 124. Clearly only one such combination is shown in FIG. 6 and others may be provided as needed.

The above described embodiments have all related to the provision back-up bearing of arrangements for electromagnetic bearings wherein inability of the bearing arrangement to suspend the shaft within a predetermined range of operational shaft positions is readily (although not necessarily) determined by the electromagnetic bearing control means, or at least position sensing means associated therewith.

It will be appreciated that back-up bearing means may be provided in a similar manner for a passive magnetic bearing, notwithstanding the possible requirement for specific position sensing means corresponding to 42 and/or 43 of FIG. 1 for providing signals to back-up control means corresponding to 56. Of course in such a passive bearing there are no electromagnetic coils to benefit from a cooling flow of the back-up bearing fluid or be a cause of bearing failure, but in other respects operation and effect are analogous.

I claim:

1. A magnetic bearing arrangement for a rotatable shaft including a magnetic bearing and back-up bearing means, the back-up bearing means comprising a hydrostatic bearing including adjacently disposed rotatable and stationary running surfaces spaced from each other to define a support gap when the shaft is within a predetermined range of operational shaft positions within said magnetic bearing, a source of pressurised fluid and back-up control means responsive to a detected inability of the magnetic bearing to support said shaft within said predetermined range of operational shaft positions providing fluid to the support gap to form therein a film at such hydrostatic pressure as to support said shaft within said predetermined range of operational shaft positions.

2. A magnetic bearing arrangement as claimed in claim 1 in which the hydrostatic bearing means is arranged by way of said back-up control means to support the shaft within said predetermined range of operational shaft positions at all rotational speeds of the shaft.

3. A magnetic bearing arrangement as claimed in claim 1 in which said hydrostatic fluid is a gas.

4. A magnetic bearing arrangement as claimed in claim 3 in which said gas is air.

5. A magnetic bearing arrangement as claimed in claim 3 in which said gas is an inert gas.

6. A magnetic bearing as claimed in claim 3 in which the arrangement forms part of a turbomachine operable to process gas at elevated pressure and said back-up bearing means fluid gas is derived at least in part from said process gas.

7. A magnetic bearing arrangement as claimed in claim 1 in which, in operation of said back-up bearing means, said back-up control means is arranged at low shaft speeds not to provide fluid to the hydrostatic bearing at such pressure to effect support of the shaft such that said adjacently disposed running surfaces are arranged to run in contact.

8. A magnetic bearing arrangement as claimed in claim 7 in which the back-up control means is arranged at low shaft speeds to provide fluid to the hydrostatic bearing at such pressure as to effect fluid flow at the contacting running surface to extract heat therefrom.

9. A magnetic bearing arrangement as claimed in claim 1 in which a said stationary running surface of the back-up bearing means comprises a surface of a solid body through which extends a fluid channel opening to said running surface.

10. A magnetic bearing arrangement as claimed in claim 9 in which the solid body comprises a block of low-friction dry-running bearing material.

11. A magnetic bearing arrangement as claimed in claim 10 in which the solid body comprises a block of porous metal loaded with a dry lubricant material.

12. A magnetic bearing arrangement as claimed in claim 1 in combination with a turbomachine operable to process a fluid at elevated pressure.

13. A magnetic bearing arrangement as claimed in claim 12 wherein the back-up bearing means fluid is derived at least in part from the process fluid.

14. A magnetic bearing arrangement for a rotatable shaft including a magnetic bearing and back-up bearing means, the back-up bearing means comprising a hydrostatic bearing including adjacently disposed rotatable and stationary running surfaces spaced from each other to define a support gap when the shaft is within a predetermined range of operational shaft positions within said magnetic bearing, a source of pressurized fluid and back-up control means responsive to a detected inability of the magnetic bearing to support said shaft within said predetermined range of operational shaft positions for providing fluid to the support gap to form therein a film at such hydrostatic pressure as to support said shaft within said predetermined range of operational shaft positions;

wherein said stationary running surface of the back-up bearing means comprises a surface of a solid body through which extends a fluid channel opening to said running surface;

and further wherein the solid body carries a stationary running surface of a radial journal bearing and a stationary running surface of an axial thrust bearing, each running surface having a fluid channel associated therewith and, between said stationary running surface, means to prevent fluid leakage form one bearing interfering with operation of the other.

15. A magnetic bearing arrangement as claimed in claim 14 in which said means to prevent fluid leakage from one bearing from interfering with operation of the other comprises at least one drain channel extending through said solid body and opening to an interface between the running surfaces of said radial and axial bearings defined by the body.

* * * * *